US011332397B2

(12) United States Patent
Farhan et al.

(10) Patent No.: US 11,332,397 B2
(45) Date of Patent: May 17, 2022

(54) TREATMENT OF ACROLEIN AND ACROLEIN BY-PRODUCTS IN WATER AND/OR WASTEWATER

(71) Applicant: EMG International, LLC, Wallingford, PA (US)

(72) Inventors: Yassar Farhan, Wallingford, PA (US); Manaf H. Farhan, Wallingford, PA (US)

(73) Assignee: EMG International, LLC, Wallingford, PA (US)

( * ) Notice: Subject to any disclaimer, the term of this patent is extended or adjusted under 35 U.S.C. 154(b) by 105 days.

(21) Appl. No.: 16/848,176

(22) Filed: Apr. 14, 2020

(65) Prior Publication Data
US 2021/0317017 A1 Oct. 14, 2021

(51) Int. Cl.
| C02F 1/78 | (2006.01) |
| C02F 1/74 | (2006.01) |
| C02F 1/66 | (2006.01) |
| C02F 1/58 | (2006.01) |
| C02F 101/34 | (2006.01) |

(52) U.S. Cl.
CPC .......... *C02F 1/78* (2013.01); *C02F 1/58* (2013.01); *C02F 1/66* (2013.01); *C02F 1/74* (2013.01); *C02F 2101/34* (2013.01)

(58) Field of Classification Search
CPC ...... C02F 1/78; C02F 1/74; C02F 1/66; C02F 2101/34; C02F 1/306; C02F 1/58; C02F 1/72; C02F 1/727; C02F 2103/007; C02F 2103/365; C07C 45/27; C07C 45/32; C07C 45/40; C07C 45/783; C07C 45/85; C07C 45/86
See application file for complete search history.

(56) References Cited

U.S. PATENT DOCUMENTS

| 3,909,408 | A | 9/1975 | Ishida et al. | |
| 3,923,648 | A | 12/1975 | Lashley, Jr. | |
| 5,606,094 | A | 2/1997 | Roof et al. | |
| 6,227,289 | B1 | 5/2001 | Yokoyama et al. | |
| 6,358,478 | B1* | 3/2002 | Soremark | A61L 2/10 250/435 |
| 8,295,814 | B2* | 10/2012 | Esteve Balducci | H04W 4/12 455/412.1 |
| 2002/0030022 | A1* | 3/2002 | Bradley | C02F 1/78 210/752 |
| 2003/0143143 | A1* | 7/2003 | Matsumoto | B01D 53/72 423/245.3 |
| 2004/0267054 | A1* | 12/2004 | Ward | C07C 253/34 568/594 |
| 2009/0159536 | A1* | 6/2009 | Hong | B09C 1/02 210/749 |
| 2016/0221848 | A1* | 8/2016 | Miller | C02F 1/78 |
| 2016/0340218 | A1* | 11/2016 | Guardino | C02F 1/78 |
| 2019/0300403 | A1* | 10/2019 | Mante | C02F 1/78 |
| 2021/0139357 | A1* | 5/2021 | Berson | C02F 1/004 |
| 2021/0214250 | A1* | 7/2021 | Imamura | B01D 61/16 |
| 2022/0055928 | A1* | 2/2022 | Farhan | C02F 1/74 |

OTHER PUBLICATIONS

Ronald Eisler, "Acrolein Hazards to Fish, Wildlife and Inverterates: A Synoptic Review", U.S. Department of the Interior, National Biological Survey, Patuxent Environmental Science Center, Biological Report 23, Contaminant Hazard Reviews Report 28, Jun. 1994. (Year: 1994).*
D. P. Ghilarducci et al, "Fate and effects of acrolein", Rev. Environ. Contam. Toxicol., 1995, vol. 144, (Abstract) (Year: 1995).*
Seok-Young Oh, "Reduction of acrolein by elemental iron: kinetics, pH effect, and detoxification", Environ. Sci. Technol. 2006, Apr. 15, 40(8), Abstract (Year: 1995).*
Adrian J. Nordone et al, The Mobility and Degradation of Acrolein in Agricultural Canals Treated with Magnacide H Herbicide, Chemosphere, vol. 32, No. 5, pp. 807-814, published 1996. (Year: 1996).*
R. Medina-Navarro et al, "Identification of acrolein from the ozone oxidation of unsaturated fatty acids", Human & Experimental Toxicology 1999, vol. 18, pp. 677-682. (Year: 1999).*
EPA Reregistration Eligibility Decision (RED) Document for Acrolein, List B, Case No. 2005, United States Environmental Protection Agency, Prevention, Pesticides and Toxic Substances, Published Sep. 2008. (Year: 2008).*
Callahan, M., et al., Water-Related Environmental Fate of 129 Priority Pollutants, vol. I: Introduction and Technical Background, Metals and Inorganics, Pesticides, and PCBs. Office of Water Planning and Standards, Office of Water and Waste Management, USEPA, 1981, Washington, D.C., pp. 485.

* cited by examiner

Primary Examiner — Joseph W Drodge
(74) Attorney, Agent, or Firm — Dickinson Wright PLLC

(57) ABSTRACT

A process is disclosed for treating water, such as wastewater, with ozone under alkaline and acidic conditions to decompose and remove acrolein and acrolein byproducts from the water and/or wastewater. The process is able to lower the concentration of acrolein and acrolein byproducts from water to a sufficiently low level suitable for discharge to a municipal sewer collection system with reduced occurrence of the decomposition by-products of acrolein converting back to acrolein in the water. One embodiment of the process treats contaminated water containing acrolein with ozone by sparging or bubbling ozone through the contaminated water. The contaminated water can be treated with ozone where the contaminated water is initially adjusted to a pH greater than 7.0 for a time to convert at least a portion of the acrolein to 3-hydroxypropanal to obtain a partially treated water. The pH of the partially treated water is then adjusted to a pH below 7.0 while continuing the ozone treatment for a time sufficient to react with and decompose the 3-hydroxypropanal to inhibit the conversion of 3-hydroxypropanal back to acrolein.

21 Claims, No Drawings

TREATMENT OF ACROLEIN AND ACROLEIN BY-PRODUCTS IN WATER AND/OR WASTEWATER

FIELD OF THE INVENTION

The invention relates to a process for removing acrolein and acrolein by-products from water by contacting the water with ozone under a specific sequence of alkaline-acidic pH conditions. The process particularly relates to complete or nearly complete removal of acrolein and acrolein by-products from water and/or to prevent the potential of any by-products from reverting back to form the parent compound (acrolein) after the treatment unit.

BACKGROUND OF THE INVENTION

Acrolein, an alpha, beta unsaturated aldehyde, is a highly soluble hazardous compound in water (Eisler, 2007, Bowmer et al., 1974). It is highly toxic to bacteria, algae, and aquatic life in water at concentrations between 0.02 mg/L and 2.5 mg/L (USEPA, 2008). It is used as a biocide and an herbicide to control growth of submerged and floating aquatic weeds and algae in irrigation canals and reservoirs, as well as being used to prevent or reduce growth of bacteria in pipes used in petroleum production (USEPA, 2008). It can also be inadvertently produced from the combustion of biodiesels and biofuels in soot or condensate. Acrolein readily reacts with water through a hydration reaction to produce various by-products including 3-hydroxypropanal, acrylic acid, and allyl alcohol (Callahan et al., 1981). This reaction is a potentially reversible reaction that could become the rate-limiting step in the overall removal of acrolein from water. The acrolein hydration by-products can persist in water if they are not directly treated. The rate of acrolein hydration reactions is influenced by pH; specific pH levels result in acrolein transforming to 3-hydroxypropanal and other by-products (UK, 2009).

The required time duration for acrolein reactions and breakdown in water ranges from several hours to a few days. When present in industrial wastewaters discharged to sewers, the extent of natural acrolein breakdown in water will depend on water temperature, pH, other chemicals present in the water, and travel time through the sewer system. Even if low concentrations of acrolein reach municipal wastewater treatment plants, it can kill or severely inhibit bacterial activity and treatment capacity at those plants (Stack, 1957). Thus, the need for complete removal of acrolein and its byproducts from water and wastewater is well recognized in the wastewater treatment field (Kurian et al., U.S. Pat. No. 6,277,289).

There are many methods identified for removing acrolein from water including membrane separation, activated carbon, ion exchange resins, and chemical addition. Roof and Reid, 1997 (U.S. Pat. No. 5,606,094) patented a method for directly scavenging acrolein from liquid or gaseous mixtures using sodium bisulfite (Roof and Reid, 1997). Ishida et al., 1975 (U.S. Pat. No. 3,909,408) patented a process for treating aldehydes from a gas or liquid mixture using an aqueous solution of sodium sulfite-sodium bisulfite agents at a solution pH of 6-11 standard units (s.u.). Lashley, 1975 (U.S. Pat. No. 3,923,648) patented a process for disposal of wastewater containing unsaturated aldehydes by maintaining the wastewater at a pH of at least 8 and a temperature between 25° C. and 100° C. (Lashley et al., 1975). Kurian et al., 2001 (U.S. Pat. No. 6,277,289 B1) patented a process for treatment of aqueous aldehydes and/or ketones by contact with organic diamines, triamines, tetraamines, polyamines, and/or inorganic ammonium compounds (Kurian et al., 2001).

Although the available methods, some of which are listed above, have varying degrees of success in degrading and removing acrolein from water; these methods all share the potential of degrading acrolein to its by-products without necessarily removing these by-products during treatment. By not removing acrolein's by-products in water, depending on prevailing pH conditions of the treatment process, acrolein can transform into one of its hydration by-products (e.g., 3-hydroxypropanal) and pass through treatment unchecked only to revert back to the parent compound (acrolein) at a later time when different pH conditions occur. This reverse reaction can re-introduce acrolein into the treated water stream after it passed through the treatment process, causing elevated/hazardous acrolein concentrations to be discharged into the environment. There remains a need today in industrial applications for a treatment process that effectively and consistently removes both acrolein and its by-products. The objective of the present invention is to promote the degradation of acrolein and its reversible by-products to effectively, substantively and permanently remove acrolein and its by-products, (e.g., 3-hydroxypropanal, acrylic acid, and allyl alcohol) from water.

SUMMARY OF THE INVENTION

Keeping in mind the disadvantages inherent in the known methods of removing acrolein from water, such as wastewater, one objective of this invention is to provide a process for effectively and permanently removing acrolein and acrolein reaction products and/or by-products from water.

Another objective of this invention is to provide a process for removing acrolein and acrolein by-products in contaminated water which does not require a complex series of specialized steps. The contaminated water being treated can be any water source containing acrolein, such as wastewater from an industrial process or facility.

An important objective of this invention is to provide a process for removing acrolein and acrolein reaction products and/or by-products with low associated operations and maintenance (O&M) cost.

A further objective of this invention is to provide a technique of removing acrolein and acrolein reaction products and/or by-products from water, such as wastewater, using readily available materials and methods.

In carrying out these and other objectives, this invention provides, in one form, a process for removing acrolein and acrolein by-products from water by maintaining the pH of the water initially at alkaline pH and contacting the water with ozone, and then dropping the pH of the water to an acidic pH in the presence of ozone in a manner that effectively and substantially oxidizes both acrolein and acrolein by-products in the water to decompose the acrolein and acrolein reaction products ultimately to form carbon dioxide. In one embodiment, the alkaline pH can be in the range of about pH 8.0 to about pH 12.0 s.u. In an embodiment of the process, the acidic pH range can be about pH 2.0 to about pH 6.0 s.u. Also provided herein, in one form, are the experimental procedures for two other processes, namely hydrogen peroxide treatment at alkaline pH, and sodium bisulfite treatment at alkaline pH, that, by contrast, were not effective at substantially removing soluble acrolein and its by-products from water and/or wastewater at the selected dosing rates.

In one embodiment, the process of treating contaminated water containing acrolein includes the steps of adjusting the pH of the contaminated water to an alkaline pH and continuously introducing ozone to the contaminated water to convert at least a portion of the acrolein to 3-hydoxypropanal, decompose at least a portion of the acrolein and 3-hydroxypropanal, and obtain a partially treated water. The pH of the partially treated water is adjusted to an acidic pH in the presence of the continuous ozone source or by the addition of an acid to obtain an acidic partially treated water. The acidic partially treated water containing acrolein and/or 3-hydroxypropanal is continuously treated with the ozone to decompose at least a portion of the 3-hydroxypropanal to reduce the 3-hydroxypropanal content of the acidic partially treated water to inhibit the conversion of 3-hydroxypropanal back to acrolein in the treated water.

DETAILED DESCRIPTION OF THE INVENTION

Herein, the term "water" is used to refer to water in many forms, including streams of water, wastewater from any industry or source, natural sources and bodies of water, and mixtures thereof. Contaminated water is intended to refer to water containing levels of acrolein and/or acrolein reaction products such that the contaminated water cannot be discharged to municipal wastewater.

As used herein, the term "alkaline" is used to refer to a water pH above pH 7.0. In one embodiment the alkaline water treatment is at a pH range between about pH 8.0 and about pH 12.0 s.u. In other embodiments, the alkaline water treatment can be at pH of about pH 8.5 to about pH 11.0.

As used herein, the term "acidic" is used to refer to a water having a pH below 7.0. In one embodiment, the acidic water treatment has pH range between about pH 2.0 and about pH 6.0 s.u. In other embodiments, the acidic water treatment can be at a pH of about pH 3.5 to about pH 5.0.

This invention relates to the process of treating water that contains acrolein and/or acrolein reaction products or acrolein by-products in order to significantly and permanently reduce the concentration of acrolein and acrolein reaction products and/or by-products and convert the acrolein and acrolein reaction products and/or by-products ultimately to carbon dioxide. In one embodiment, the process treats contaminated water containing acrolein to convert at least a portion of the acrolein to 3-hydroxypropanal, acrylic acid, and allyl alcohol, while continuously introducing ozone in an amount sufficient to decompose at least a portion of the acrolein, 3-hydroxypropanal, acrylic acid, and allyl alcohol. The ozone treatment decomposes the 3-hydroxypropanal, acrylic acid, allyl alcohol, and other reaction products to inhibit the conversion of 3-hydroxypropanal back to acrolein in the water.

The process described herein involves contacting ozone (through sparging or bubbling) with contaminated water that contains acrolein where the water initially has an alkaline pH, followed by intentionally dropping the pH of the contaminated water to acidic levels while continuing contact with ozone. The initial alkaline treatment of the aqueous solution of acrolein converts at least a portion of the acrolein to 3-hydroxypropanal and other reaction products and by-products. The effect of the process is to contact the acrolein and acrolein reaction products, such as 3-hydroxypropanal, with a continuous source of ozone to substantially decompose and remove acrolein and decompose 3-hydroxypropanal present in the water and ultimately decompose or convert the acrolein and 3-hydroxypropanal to carbon dioxide, without providing an opportunity for the other potential acrolein by-products, such as allyl alcohol and acrylic acid, to form during treatment. The process step under alkaline conditions first transforms acrolein (AC) to its reversible hydration by-product, 3-hydroxypropanal. By subsequently lowering the pH in the presence of ozone, the process effectively and substantially removes acrolein and its reversible 3-hydroxypropanal (3-HP) from the water by converting the acrolein and/or 3-hydroxypropanal to carbon dioxide by the continuous contact with ozone. Decomposing and removing the 3-hydroxypropanal from the water in the presence of ozone inhibits the 3-hydroxypropanal from converting back to acrolein in the water downstream of the treatment zone. The process is able to decompose acrolein, 3-hydroxypropanal and other reaction products in the treated water to a concentration of 1 mg/L or less (0.0001 wt %).

Acrolein's reaction with water, catalyzed by both hydrogen and hydroxide ions, is a reversible, first order hydration reaction which forms 3-hydroxypropanal (β-hydroxypropionaldehyde) as follows (Callahan et al., 1981):

Hydration:

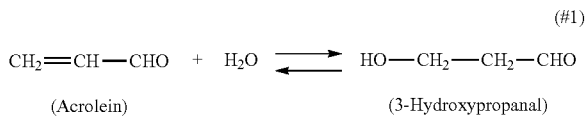

(#1)

$CH_2$=$CH$—$CHO$ + $H_2O$ ⇌ $HO$—$CH_2$—$CH_2$—$CHO$ (Acrolein)                           (3-Hydroxypropanal)

The hydration reaction, the rate of which increases with higher acid concentration under alkaline conditions, is the result of nucleophilic attack of the hydroxyl radicals on the outer carbon centers in acrolein (Bowmer and Higgins, 1976). This reaction is reversible and hydration by-products can persist in water for several days (USEPA, 1985; WHO, 1992). It is important to note that, although hydration of acrolein maintains the aldehyde group in the compound, the by-products in water will have different physical properties than acrolein due to the structural changes that occur to the parent compound in water. When acrolein is being degraded or volatilized, the hydration by-products can act as a reservoir for the parent compound and could become the rate-limiting step in the overall removal/loss of acrolein (UK, 2009).

The fact that acrolein easily converts to various reaction products or by-products when dissolved in water can make calculating the total amount removed more complex. In order to provide a clear and accurate calculation of acrolein removal, account must be taken for the removal of acrolein reaction products and byproducts that are created during the hydration reaction in the water treatment process. Therefore, the results herein convert or express the concentration of "acrolein by-products" or "acrolein reaction products" as "acrolein" using molar ratios that are derived from the balanced stoichiometric equation. Specifically, because 3-HP (3-hydroxypropanal) is created during certain steps in the process, in order to facilitate an accurate and meaningful percent removed calculation herein, the measured concentrations of AC in the experimental procedure have been expressed as AC (acrolein) using this stoichiometric calculation.

Based on the balanced stoichiometric reaction (#1) above, and for a complete reaction with water, one (1) mole of AC (56.0 grams/mole), reacts with water to produce one (1) mole of 3-HP (74.0 grams/mole), or 1 mg/L of AC will react with water to produce 1.32143 mg/L of 3-HP. Conversely, every 1 mg/L of 3-HP in solution, can be expressed as 0.75676 mg/L as AC. To facilitate an accurate and meaningful percent removed, the measured concentration of 3-hydroxypropanal in the experimental procedure is expressed as AC using the stoichiometric calculation. The experimental procedures used herein had a detection limit of 1.0 mg/L for AC and 3-HP, therefore, measured concentrations below 1.0 mg/L were considered non-detect, or zero.

It has also been shown experimentally that this treatment process does not promote the generation of other AC by-products, namely acrylic acid (ACA) and/or allyl alcohol (ALA) that could compromise or interfere with removal of residual acrolein and/or the acrolein reaction products present in the treated water in a downstream treatment process. The proportions or amounts remaining of AC and the reaction products and/or by-products during ozone bubbling/sparging at alkaline pH followed by acidic pH conditions while continuous bubbling/sparging with ozone are provided in Table 1 below.

TABLE 1

Removal of Acrolein and its Selected By-Products during Treatment with Ozone under Alkaline-Acidic pH Conditions.

| Chemical | Average Concentration (mg/L) | | | Percent Removed (%) |
|---|---|---|---|---|
| | Start Time | After 8 hrs | After 36 hrs | |
| AC | 11.73 | <1.0 | <1.0 | — |
| 3-HP (expressed as AC) | 1.68 | 5.15 | <1.0 | — |
| Total (expressed as AC) | 13.41 | 5.15 | <1.0 | 100% |
| pH | Alkaline | | Acidic | — |

As shown in Table 1, the sample as measured at the start of the treatment experiment contained both AC and 3-HP as some of the AC added is rapidly converted to 3-HP. As described above, to obtain the initial total AC concentration, the actual measured concentration of AC (11.73 mg/L) was combined with the measured concentration of 3-HP expressed as AC (1.68 mg/L), for a combined total concentration of 13.41 mg/L, AC as expressed. This concentration represents the starting AC concentration before treatment is initiated. The same measurement process was used for all samples. After 36 hours the average total AC concentration was below the detection limit (<1.0 mg/L, expressed as AC). This treatment process achieved a substantial amount of overall AC and related reaction products and/or by-products removal; indeed, 100% removal of AC and related reaction products and/or by-products was measured as a result of this treatment process.

By "substantial amount" it is meant that the total concentration of acrolein and/or its by-products removed after treatment will be in excess of 80% of the total concentration measured in the water and/or wastewater at the start time of the experiment.

Unlike in a controlled laboratory setting, it will be understood that under certain field operating conditions, the water to be treated may initially be adjusted or controlled at alkaline and/or acidic pH for different time periods, and as a result of these varying initial conditions the water may contain only acrolein reaction products and/or by-products, or acrolein or acrolein reaction products and/or by-products with other contaminants or by-products that have a similar molecular structure such as ketones and aldehydes. For example, some water streams may contain a mixture of AC and/or 3-HP among other chemicals such as propionaldehyde (another potential AC reaction product). Regardless of the initial state of such streams with varying conditions, the process will be effective at treating acrolein and acrolein reaction products and/or by-products.

The process in one embodiment for treating contaminated water containing acrolein and/or 3-hydroxypropanal by adding an effective amount of buffer compound, to adjust or increase the pH of the water to about pH 8.0 to about pH 12.0 standard units (s.u.) and then contacting the water with ozone for a period of time sufficient to substantially degrade/transform acrolein into a combination of carbon dioxide and 3-HP, and then dropping the pH of the contaminated water to about pH 2.0 to about pH 6.0 s.u. while maintaining the continuous contact with ozone to substantially decompose and remove remaining acrolein and acrolein reaction products and/or by-products, such as 3-hydroxypropanal. The process of contacting contaminated water with ozone tends to decrease the pH of the water. If contacting water with ozone does not decrease the pH of the water to pH of 6.0 or below within a practical time period as it relates to the overall treatment process, the pH of the water can be decreased rapidly by adding an effective amount of acid.

A suitable acid can be added to the contaminated water after the alkaline treatment in the presence of ozone, where the partially treated contaminated water contains the acrolein and 3-hydroxypropanal and other by-products, such as acrylic acid and ally alcohol. The acid can be added in an amount to lower the pH to about pH 2.0 to about pH 6.0. The acid can be a mineral acid, such as hydrochloric acid or sulfuric acid.

Ozone generation units of various sizes and capacities are readily available in the marketplace (EPA, 1999). Buffer chemicals for increasing the pH of the water to 8.0-12.0 s.u. are readily available in the market. Similarly, acids to reduce the pH of the water to 2.0-6.0 s.u. are also readily available in the market. This process does not require the use of particular acids or buffers. Inexpensive, readily available, typically used acids and buffer are effective for this treatment.

To further improve decomposition and removal of acrolein and acrolein by-products by this treatment process, the water is mixed within a reaction chamber by stirring, in the case of batch processes, or by static in-line mixers, baffles or other such means for continuous processes to provide continuous mixing and continuous contact of the ozone with contaminated water and the acrolein and 3-hydroxypropanal contained in the contaminated water.

The process is effective in the ambient temperature range, defined here as 0° C.-45° C.

The treatment of the excess ozone that is emitted during sparging/bubbling is accomplished by various ozone destruction techniques that are readily available in the market including, but not limited to, organic or inorganic catalysts operated at high temperatures (above 100° C.). The ozone treatment of the contaminated water can be by any suitable ozone contact method that provides a sufficient rate and amount of ozone in the contaminated water to treat the water and decompose acrolein and 3-hydroxypropanal. The ozone can be supplied as ozone enriched air at a suitable ozone concentration to provide the ozone in an amount to effectively decompose acrolein, 3-hydroxypropanal, and other organic compounds, such as acrylic acid and allyl alcohol, in the contaminated water. The ozone concentration in the air can be about 0.5 wt % to about 1.5 wt %. In one embodiment, the ozone and air mixture is added to the contaminated water to provide an ozone concentration up to about 0.74 wt % based on the weight of the contaminated water containing about 10 to 13 mg/L acrolein. The rate of addition of the ozone enriched air to the water can be about 1.5 to about 5.0 liters per minute. In one embodiment, the ozone enriched air is bubbled through the contaminated water at a rate of about 2.6 liters per minute. In another embodiment, the ozone/air mixture can be introduced to the contaminated water to provide about 0.01 to 100 g ozone per hour per liter of contaminated water.

EXPERIMENTAL PROCEDURES

The experimental procedure used to demonstrate the treatment process for decomposing and removing acrolein and 3-hydroxypropanal from contaminated water as follows:
1. Prepare a stock solution containing 200 mg/L of acrolein (AC) in water.
2. Set up three (3) Erlenmeyer flasks, add 950 milliliters (mls) of water to each one. Adjust water pH to the range of 4.0-5.0. Maintain the water well mixed with a magnetic stirrer.
3. Add 50 milliliters (mls) of the stock solution containing AC to each flask to increase the starting AC concentration in the flasks to near 10 mg/L. No other contaminants or acrolein by-products are added to the treatment flasks.
4. Collect a sample from each flask and analyze for acrolein (AC), 3-hydroxypropanal (3-HP), acrylic acid (ACA), and allyl alcohol (ALA). This sample is designated as the "0 hrs" sample which represents the starting concentration of acrolein and its by-products prior to initiating treatment.
5. After the "Time 0" sample is collected, adjust the pH of the flask to a pH 8.0-12.0 s.u. Monitor and maintained pH between 8.0-12.0 s.u. during each treatment by adding small amounts of buffer as needed.
6. Start one of the following treatment processes in each of the flasks. The three treatment processes tested are:
A) Treatment with hydrogen peroxide;
B) Treatment with sodium bisulfite; and
C) Treatment with ozone.
7. Collect approximately 40 ml samples at each sampling time and analyze the sample for AC, 3-HP, ACA, and ALA.
8. Reduce the pH of the solution in the treatment process to 2.0-6.0 s.u. after a certain period of time to remove acrolein by-products.
9. For AC and 3-HP analysis, samples are derivatized with 2,4-dinitrophenylhydrazine (DNPH) then analyzed by injecting 10 micro-liters into an Agilent 1290 High-Performance Liquid Chromatography (HPLC) system with Ultra-Violet (UV) detection at 360 nm.
10. For ACA analysis, samples are analyzed by directly injecting 10 micro-liters into the HPLC system with UV detection at 220 nm.
11. For ALA analysis, samples are analyzed by directly injecting 40 micro-liters into the HPLC system with UV detection at 200 nm.
12. All samples are analyzed in duplicates (designated as DUP.)
13. Standard curves relating HPLC-UV area counts to chemical concentration for each of the analyzed chemicals are developed before starting the treatment processes.
14. At the end of each treatment process, calculate the percent removed of AC and its transformation by-products using the following formula:

$$\text{Percent Removed} = \frac{[\text{Total } AC]_{T0} - [\text{Total } AC]_{TFinal}}{[\text{Total } AC]_{T0}} \times 100\%$$

Where:
[Total AC]$_{T0}$ denotes Total concentration of AC and 3-HP measured at the start time of the experiment, and expressed as AC mg/L
[Total AC]$_{TFinal}$ denotes Total concentration of AC and 3-HP measured at the end time of the experiment, and expressed as AC mg/L
15. To identify unknown peaks of by-products that may appear during the treatment process, use Quadruple Time of Flight Liquid Chromatography Mass Spectrometry (QTOF-LCMS) analysis utilizing an Agilent 6545 QTOF LCMS with Agilent 1290 HPLC system. QTOF-LCMS is a method used for more definitive identification of ionizable sample components with molecular weights less than 2,000 atomic mass unit (amu). QTOF-LCMS provides a highly accurate mass for the molecules (up-to four (4) decimal places), as well as fragmentation spectra and precise elemental composition for the unknown compound.
16. An injection of a standard amount of AC, 3-HP, ACA, and ALA is performed for each chemical during each treatment process to confirm the accuracy of, and chemical recovery from the HPLC-UV method. The recovery of all standard amounts for all four chemicals was consistently measured between 96% and 106% of the injected amount (100%).

Performance results of the three treatment processes tested are shown below.

Treatment A

Treatment of Acrolein and its by-Products with a Hydrogen Peroxide Process at an Alkaline pH of Water and/or Wastewater To evaluate the removal effectiveness of hydrogen peroxide with alkaline pH conditions on AC and its selected by-products, 14 milliliters (mls) of 30% hydrogen peroxide solution was added to one (1) liter of water with a pH between 8.0-12.0 s.u. containing AC. The resulting hydrogen peroxide concentration in the treatment flask is approximately 0.42%, or 4,200 mg/L hydrogen peroxide. This dosing level provides an excess of hydrogen peroxide required to fully remove the starting acrolein concentration of 10 mg/L at neutral pH conditions (EPA, 1999). The hydrogen peroxide treatment process was monitored over a 36-hour period. Samples were collected from the treatment flask at the beginning of the study (before initiating hydrogen peroxide and alkaline pH treatment), and then after 4 hours, 8 hours, 24 hours, and 36 hours of treatment. Samples were analyzed for AC, 3-HP, ACA, and ALA. Results from this treatment process are shown in Table 2 below.

TABLE 2

Removal of Acrolein and its Selected By-Products during Treatment with Hydrogen Peroxide under Alkaline pH Conditions.

| Chemical | Concentration (mg/L) Measured after Hours of Treatment Shown | | | | | Percent AC Removed (%) |
|---|---|---|---|---|---|---|
| | 0 hrs | 4 hrs | 8 hrs | 24 hrs | 36 hrs | |
| AC | 10.94 | 7.73 | 6.68 | 7.14 | 6.45 | — |
| AC DUP | 11.15 | 7.71 | 6.69 | 7.14 | 6.45 | — |
| 3-HP (expressed as AC) | 1.7 | <1.0 | <1.0 | <1.0 | <1.0 | — |
| 3-HP DUP (expressed as AC) | 1.7 | <1.0 | <1.0 | <1.0 | <1.0 | — |
| ACA | <1.0 | <1.0 | <1.0 | <1.0 | <1.0 | — |
| ACA DUP | <1.0 | <1.0 | <1.0 | <1.0 | <1.0 | — |
| ALA | <1.0 | <1.0 | <1.0 | <1.0 | <1.0 | — |
| ALA DUP | <1.0 | <1.0 | <1.0 | <1.0 | <1.0 | — |
| Average Total (expressed as AC) | 12.75 | 7.72 | 6.69 | 7.14 | 6.45 | 49.4% |
| pH (s.u.) | 10.0 | 9.92 | 8.82 | 8.54 | 9.28 | — |

In Table 2, ACA refers to acrylic acid, and ALA refers to allyl alcohol.

As shown in Table 2, the average initial total AC concentration was 12.75 mg/L (expressed as AC). This concentration represents the starting AC concentration before treatment is initiated. After 4 hours of treatment, the average total AC concentration was 7.72 mg/L (expressed as AC). After 8 hours, the average total AC concentration was 6.69 mg/L (expressed as AC). After 24 hours, the average total AC concentration was 7.14 mg/L (expressed as AC), and after 36 hours the average total AC concentration was 6.45 mg/L (expressed as AC). The average ACA concentration and ALA concentration remained below detection (<1.0 mg/L) throughout this treatment. These results show that the hydrogen peroxide reactions at alkaline pH were complete after approximately 8 hours of treatment and that this method overall only achieved 49.4% AC removal (i.e., 50.6% of AC remained).

Treatment B

Treatment with a Sodium Bisulfite Process at an Alkaline pH of Water and/or Wastewater To evaluate the removal effectiveness of sodium bisulfite with alkaline pH conditions on AC and its selected by-products, 7 mls of 10 g/L sodium bisulfate stock solution were added to one (1) liter of water containing AC and maintained at a pH between 8.0 and 12.0 s.u. The resulting starting concentration of sodium bisulfite in this treatment flask was approximately 70 mg/L. This dosing level was chosen based on results reported by Roof and Reid (1997) for sodium bisulfite direct scavenging of acrolein, and because this dosing level represents a practical dosing rate in potential field-scale applications of this treatment technology. Samples were collected from the treatment flask at the beginning of the study (before sodium bisulfite and alkaline pH treatment was initiated), and then after 4 hours, 8 hours, 24 hours, and 36 hours of treatment. Samples were analyzed for AC, 3-HP, ACA, and ALA. Results from this treatment process are shown in Table 3 below.

TABLE 3

Removal of Acrolein and its Selected By-Products during Treatment with Sodium Bisulfite under Alkaline pH Conditions.

| Chemical | Concentration (mg/L) Measured after Hours of Treatment Shown | | | | | Percent AC Removed (%) |
|---|---|---|---|---|---|---|
| | 0 hrs | 4 hrs | 8 hrs | 24 hrs | 36 hrs | |
| AC | 11.33 | 7.16 | 7.04 | 7.11 | 5.94 | — |
| AC DUP | 11.50 | 7.17 | 7.03 | 7.13 | 5.93 | — |
| 3-HP (expressed as AC) | 1.67 | <1.0 | <1.0 | <1.0 | <1.0 | — |
| 3-HP DUP (expressed as AC) | 1.67 | <1.0 | <1.0 | <1.0 | <1.0 | — |
| ACA | <1.0 | <1.0 | <1.0 | <1.0 | <1.0 | — |
| ACA DUP | <1.0 | <1.0 | <1.0 | <1.0 | <1.0 | — |
| ALA | <1.0 | <1.0 | <1.0 | <1.0 | <1.0 | — |
| ALA DUP | <1.0 | <1.0 | <1.0 | <1.0 | <1.0 | — |
| Average Total (expressed as AC) | 13.09 | 7.17 | 7.04 | 7.12 | 5.94 | 54.7% |
| pH (s.u.) | 10.0 | 9.82 | 9.55 | 9.51 | 9.27 | — |

As shown in Table 3, the average initial total AC concentration was 13.09 mg/L (expressed as AC). This concentration represents the starting AC concentration before treatment is initiated. After 4 hours of treatment, the average total AC concentration was 7.17 mg/L (expressed as AC). After 8 hours, the average total AC concentration was 7.04 mg/L (expressed as AC). After 24 hours, the average total AC concentration was 7.12 mg/L (expressed as AC), and after 36 hours the average total AC concentration was 5.94 mg/L (expressed as AC). The average ACA concentration and ALA concentration remained below detection (<1.0 mg/L) throughout this treatment. These results show that the sodium bisulfite reactions at alkaline pH were complete after approximately 4 hours of treatment and that this method overall only achieved 54.7% AC removal (i.e., 45.3% of AC remained).

Treatment C

Treatment with an Ozone Process at an Alkaline-Acidic pH of Water and/or Wastewater To evaluate removal effectiveness of ozone with alkaline-acidic pH treatment on AC and its selected by-products, ozone-enriched air was contacted (via bubbling/sparging) with one (1) liter of water containing AC. The ozone-enriched air was bubbled at a rate of 2.6 liters per minute containing an ozone concentration of 0.74% wt, which equals an ozone dosing rate of 1.49 grams of ozone per hour per liter of water. This dosing level was chosen because it represents a practical dosing rate for potential field-scale applications of this treatment technology (EPA, 1999). This treatment is workable for ozone sparging/bubbling rates between 0.01 grams of ozone per hour per liter of water and 100 grams of ozone per hour per liter of water. The water was maintained at a pH between 8.0 and 12.0 s.u. for a certain period of time then, after acrolein was removed and acrolein reaction products and/or by-products persisted, the pH was dropped to 2.0-6.0 to promote treatment of acrolein by-products from water. Samples were collected from the treatment flask at the beginning of the study (before ozone and alkaline-acidic pH treatment was initiated), and then after 4 hours, 8 hours, 24 hours, and 36 hours of treatment.

Samples were analyzed for AC, 3-HP, ACA, and ALA. Results from this treatment are shown in Table 4 below.

TABLE 4

Removal of Acrolein and its Selected By-Products during Treatment with Ozone under Alkaline-Acidic pH Conditions.

| Chemical | Concentration (mg/L) Measured after Hours of Treatment Shown | | | | | Percent AC Removed (%) |
|---|---|---|---|---|---|---|
| | 0 hrs | 4 hrs | 8 hrs | 24 hrs | 36 hrs | |
| AC | 11.64 | <1.0 | <1.0 | <1.0 | <1.0 | — |
| AC DUP | 11.82 | <1.0 | <1.0 | <1.0 | <1.0 | — |
| 3-HP (expressed as AC) | 1.68 | 5.17 | 5.18 | 2.98 | <1.0 | — |
| 3-HP DUP (expressed as AC) | 1.69 | 4.89 | 5.14 | 3.02 | <1.0 | — |
| ACA | <1.0 | <1.0 | <1.0 | <1.0 | <1.0 | — |
| ACA DUP | <1.0 | <1.0 | <1.0 | <1.0 | <1.0 | — |
| ALA | <1.0 | <1.0 | <1.0 | <1.0 | <1.0 | — |
| ALA DUP | <1.0 | <1.0 | <1.0 | <1.0 | <1.0 | — |
| Average Total (expressed as AC) | 13.41 | 5.03 | 5.16 | 3.00 | <1.0 | 100% |
| pH (s.u.) | 9.84 | 8.97 | 8.58 | 4.69 | 4.1 | — |

As shown in Table 4, the average initial total AC concentration was 13.41 mg/L (expressed as AC). This concentration represents the starting AC concentration before treatment is initiated. After 4 hours of treatment, the average total AC concentration was 5.03 mg/L (expressed as AC). After 8 hours, the average total AC concentration was 5.16 mg/L (expressed as AC). After 24 hours, the average total AC concentration was 3.00 mg/L (expressed as AC), and after 36 hours the average total AC concentration was below the detection limit (<1.0 mg/L, expressed as AC). The average ACA concentration and ALA concentration remained below detection (<1.0 mg/L) throughout this treatment. These results show that the ozone reactions with acrolein were complete after 4 hours of treatment and that this method effectively and substantially removed AC during that period. The results also show that one AC by-product, 3-HP, accumulated during the first 4 hours of treatment, and then was effectively and substantially treated after 36 hours of treatment. This treatment process achieved complete overall removal (100% removal) of AC and its by-products.

During laboratory analysis of samples from this treatment Process, some unidentified peaks appeared during the HPLC analysis of the 4-hr, 8-hr, and 24-hr samples. These peaks exhibited aldehyde-like properties. QTOF-LCMS analysis was performed to identify these peaks. The unknown peaks were identified as propionaldehyde (propanal) and acetaldehyde. These compounds are likely to be degradation by-products from AC during treatment. These two by-products were not observed after 36 hours of treatment indicating that they were subsequently effectively and substantially removed from solution after 36 hours of treatment.

Many modifications may be made in the present invention without departing from the spirit and scope thereof which are defined only by the appended claims. For example, those skilled in the art may discover that removal of AC and its degradation by-products by ozone treatment under alkaline-acidic pH conditions works particularly well when other compounds that can influence the pH and the ozone treatment process are present in an aqueous solution containing acrolein and its by-products.

REFERENCES

Bowmer, K., and M. Higgins, 1976. Some Aspects of the Persistence and Fate of Acrolein Herbicide in Water. Archives of Environmental Contamination and Toxicology, Vol. 5, 87-96.

Bowmer, K., A. Lang, M. Higgins, A. Pillay, and Y. Tchan. 1974. Loss of Acrolein from Water By Volatilization And Degradation. Weed Research, Vol. 14, 325-328.

Callahan, M., M. Slimak, N. Gabel, I. May, C. Fowler, J. Freed, P. Jennings, R. Durfee, F. Whitmore, B. Maestri, W. Mabey, B. Holt, and C. Gould. 1981. Water-Related Environmental Fate of 129 Priority Pollutants, Volume I: Introduction and Technical Background, Metals and Inorganics, Pesticides, and PCBs. Office of Water Planning and Standards, Office of Water and Waste Management, USEPA, Washington, D.C.

Eisler, R. 2007. Eisler's Encyclopedia of Environmentally Hazardous Priority Chemicals. Elsevier Science, New York, USA. Pp. 986.

Hoigné, J. and H. Bader. 1983. Rate Constants of Reactions of Ozone With Organic And Inorganic Compounds In Water—I: Non-Dissociating Organic Compounds. Water Research, 12:2:173-183.

Ishida, S., N. Oshima, K. Kurita, I. Suzuki, and H. Ohno. 1975. Process for Treating Aldehydes. U.S. Pat. No. 3,909,408.

Kurian, J. and Y. Liang. 2001. Treatment of Aqueous Aldehydes Waste Streams. U.S. Pat. No. 6,227,289 B1.

Lashley, Jr., E. 1975. Detoxification of aldehydes and ketones. U.S. Pat. No. 3,923,648.

Roof, G. and D. Reid. 1997. Acrolein Scavengers. U.S. Pat. No. 5,606,094.

UK, 2009. Directive 98/8/EC concerning the placing of biocidal products on the market, Inclusion of active substances in Annex I to Directive 98/8/EC: Assessment Report Acrolein, Product-type 12 (Slimicide): Annex I. Competent Authority Report: UK. Pp. 48.

United States Environmental Protection Agency (USEPA). 1985. Health and Environmental Effects Profile for Acrolein. Environmental Criteria and Assessment Office, Office of Research and Development. Report No. EPA/600/X-85/369.

United States Environmental Protection Agency (USEPA). 1999. Alternative Disinfectants and Oxidants Guidance Manual. Office of Water. EPA 815-R-99-014. Pp. 346.

United States Environmental Protection Agency (USEPA). 2008. Re-registration Eligibility Decision Acrolein. Prevention, Pesticides And Toxic Substances (7508P)

World Health Organization (WHO). 1992. Environmental Health Criteria 127: Acrolein. World Health Organization, Geneva. 99 pp.

We claim:

1. A process of treating contaminated water containing acrolein comprising the steps of: adjusting the pH of said contaminated water containing acrolein to a first pH greater than 7.0 and converting a portion of said acrolein to 3-hydroxypropanal in the presence of ozone for a time sufficient to decompose a portion of said acrolein and said 3-hydroxypropanal and to obtain a partially treated water; and lowering the pH of said partially treated water to a second pH below 7.0 in the presence of ozone for a sufficient length of time to decompose remaining acrolein and 3-hydroxypropanal in said partially treated water to obtain a treated water having less than 1 mg/L acrolein and 3-hydroxypropanal.

2. A process of claim 1, wherein the first pH of the contaminated water containing acrolein is adjusted to a pH of about 8.0 to about 12.0 for a sufficient time period to convert a portion of said acrolein to 3-hydroxypropanal, and where said partially treated water is adjusted to second pH of about 2.0 to about 6.0.

3. A process of claim 2, wherein the ozone comprises an ozone and air mixture with an ozone concentration of about 0.5 wt.% about 0.74-wt.%, based on the total weight of said contaminated water and acrolein, and where said ozone and air mixture is contacted with said contaminated water at an alkaline pH and partially treated water at an acidic pH.

4. The process in claim 3 wherein the partially treated water contains acrolein reaction products.

5. The process in claim 4 wherein the contaminated water and partially treated water are treated at a temperature range from about 0° C. to 45° C.

6. The process in claim 1 wherein a portion of acrolein in said contaminated water is converted to one or more reaction products which include at least one product selected from acrylic acid and allyl alcohol.

7. The process in claim 6, wherein said contaminated and partially treated water is treated with said ozone by continuously sparging or bubbling said ozone through said contaminated and partially treated water in an amount effective to decompose said acrolein and acrolein reaction products.

8. The process in claim 7 wherein said process includes a step of mixing the contaminated water at said first pH within a reaction chamber, whereby mixing is achieved by at least one selected from the group consisting of stirring and a mechanical mixer.

9. The process of claim 7, wherein said ozone is an ozone and air mixture bubbled or sparged in said contaminated and said partially treated water at a rate of about 0.01 to about 100 grams of ozone per hour per liter of said contaminated and said partially treated water.

10. The process of claim 1, wherein said ozone is an ozone and air mixture and is continuously introduced into said contaminated water at said first pH and said partially treated water at said second pH at an ozone concentration of about 0.5 wt. % to about 0.74 wt. % in said air mixture based on the total weight of said contaminated water and said acrolein and total weight of said partially treated water and said remaining acrolein and 3-hydroxypropanal, respectfully.

11. The process of claim 1, wherein said ozone is introduced continuously to said contaminated water at said first pH at a rate sufficient and in an amount to decompose said acrolein and said 3-hydroxypropanal and said ozone introduction is continued to said partially treated water at said second pH.

12. The process of claim 1, wherein an acid is added to said partially treated water to lower the pH from said first pH to said second pH.

13. The process of claim 12, wherein said acid is a mineral acid.

14. The process of claim 1, wherein said contaminated water is industrial wastewater.

15. A process for treating contaminated water containing acrolein, said process comprising the steps of:
adjusting said contaminated water to an alkaline pH and converting a portion of said acrolein to 3-hydroxypropanal and continuously introducing ozone into said contaminated water in an amount and for a time sufficient to decompose a portion of said acrolein and said 3-hydroxypropanal in said contaminated water and to obtain a partially treated water, wherein said partially treated water is adjusted to an acidic pH; and
continuously introducing said ozone to said partially treated water to decompose remaining 3-hydroxypropanal in said partially treated water to inhibit conversion of said 3-hydroxypropanal to acrolein.

16. The process of claim 15, wherein said alkaline pH of said contaminated water is pH 8.0 to pH 12.0.

17. The process of claim 16, wherein said alkaline pH of said contaminated water is pH 8.5 to 12.0.

18. The process of claim 17, wherein said acidic pH of said partially treated water is about pH 6.0 to about pH 2.0.

19. The process of claim 16, further comprising the step of adding a mineral acid to said partially treated water to adjust said partially treated water to about pH 6.0 to about pH 2.0.

20. The process of claim 16, wherein said contaminated water has an acrolein content of about 10 to 13 mg/L, and said ozone is introduced to decompose said contaminants in said contaminated water in an amount to obtain an ozone concentration of about 0.5 wt. % to about 0.74 wt. % based on the total weight of said contaminated water, acrolein, and 3-hydroxypropanal.

21. The process of claim 20, wherein said ozone is introduced to said contaminated water and said partially treated water at a rate of about 1.5 to 5 L/min, respectfully.

* * * * *